# United States Patent
Grichnik et al.

(10) Patent No.: US 7,593,804 B2
(45) Date of Patent: Sep. 22, 2009

(54) FIXED-POINT VIRTUAL SENSOR CONTROL SYSTEM AND METHOD

(75) Inventors: Anthony J. Grichnik, Peoria, IL (US); James Mason, Peoria, IL (US); Tim Felty, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 126 days.

(21) Appl. No.: 11/980,610

(22) Filed: Oct. 31, 2007

(65) Prior Publication Data
US 2009/0112334 A1    Apr. 30, 2009

(51) Int. Cl.
*G06F 19/00* (2006.01)
*G06F 7/00* (2006.01)
(52) U.S. Cl. .................................. 701/101; 701/115
(58) Field of Classification Search ................. 701/101, 701/102, 115, 1, 29, 31, 33; 702/85, 182, 702/183, 189; 706/23, 25
See application file for complete search history.

(56) References Cited

U.S. PATENT DOCUMENTS

| | | | |
|---|---|---|---|
| 3,316,395 A | 4/1967 | Lavin | |
| 4,136,329 A | 1/1979 | Trobert | |
| 4,533,900 A | 8/1985 | Muhlberger et al. | |
| 5,014,220 A | 5/1991 | McMann et al. | |
| 5,163,412 A | 11/1992 | Neu et al. | |
| 5,262,941 A | 11/1993 | Saladin et al. | |
| 5,341,315 A | 8/1994 | Niwa et al. | |
| 5,386,373 A | 1/1995 | Keeler et al. | |
| 5,434,796 A | 7/1995 | Weininger | |
| 5,539,638 A | 7/1996 | Keeler et al. | |
| 5,548,528 A | 8/1996 | Keeler et al. | |
| 5,561,610 A | 10/1996 | Schricker et al. | |
| 5,566,091 A | 10/1996 | Schricker et al. | |
| 5,585,553 A | 12/1996 | Schricker | |

(Continued)

FOREIGN PATENT DOCUMENTS

EP     1103926     5/2001

(Continued)

OTHER PUBLICATIONS

Allen et al., "Supersaturated Designs That Maximize the Probability of Identifying Active Factors," 2003 American Statistical Association and the American Society for Quality, Technometrics, vol. 45, No. 1, Feb. 2003, pp. 1-8.

(Continued)

*Primary Examiner*—Hieu T Vo
(74) *Attorney, Agent, or Firm*—Finnegan, Henderson, Farabow, Garrett & Dunner (57) ABSTRACT

One aspect of the present disclosure includes a method for a control system of a machine. The method may include establishing a virtual sensor model indicative of interrelationships between at least one sensing parameter and a plurality of measured parameters related to the machine. The method may also include obtaining data and function information representing the virtual sensor model and converting the data information into fixed-point representation. Further, the method may include converting the function information into fixed-point representation and loading the converted fixed-point representation of data information and function information in the control system such that the control system uses the virtual sensor model in fixed-point arithmetic operation.

18 Claims, 7 Drawing Sheets

U.S. PATENT DOCUMENTS

| | | | |
|---|---|---|---|
| 5,594,637 | A | 1/1997 | Eisenberg et al. |
| 5,598,076 | A | 1/1997 | Neubauer et al. |
| 5,604,306 | A | 2/1997 | Schricker |
| 5,604,895 | A | 2/1997 | Raimi |
| 5,608,865 | A | 3/1997 | Midgely et al. |
| 5,666,297 | A | 9/1997 | Britt et al. |
| 5,682,317 | A | 10/1997 | Keeler et al. |
| 5,698,780 | A | 12/1997 | Mizutani et al. |
| 5,727,128 | A | 3/1998 | Morrison |
| 5,750,887 | A | 5/1998 | Schricker |
| 5,752,007 | A | 5/1998 | Morrison |
| 5,835,902 | A | 11/1998 | Jannarone |
| 5,842,202 | A | 11/1998 | Kon |
| 5,864,773 | A * | 1/1999 | Barna et al. .................. 702/85 |
| 5,914,890 | A | 6/1999 | Sarangapani et al. |
| 5,925,089 | A | 7/1999 | Fujime |
| 5,950,147 | A | 9/1999 | Sarangapani et al. |
| 5,966,312 | A | 10/1999 | Chen |
| 5,987,976 | A | 11/1999 | Sarangapani |
| 6,086,617 | A | 7/2000 | Waldon et al. |
| 6,092,016 | A | 7/2000 | Sarangapani et al. |
| 6,119,074 | A | 9/2000 | Sarangapani |
| 6,145,066 | A | 11/2000 | Atkin |
| 6,195,648 | B1 | 2/2001 | Simon et al. |
| 6,199,007 | B1 | 3/2001 | Zavarehi et al. |
| 6,208,982 | B1 | 3/2001 | Allen, Jr. et al. |
| 6,223,133 | B1 | 4/2001 | Brown |
| 6,236,908 | B1 | 5/2001 | Cheng et al. |
| 6,240,343 | B1 | 5/2001 | Sarangapani et al. |
| 6,269,351 | B1 | 7/2001 | Black |
| 6,298,718 | B1 | 10/2001 | Wang |
| 6,370,544 | B1 | 4/2002 | Krebs et al. |
| 6,405,122 | B1 | 6/2002 | Yamaguchi |
| 6,438,430 | B1 | 8/2002 | Martin et al. |
| 6,442,511 | B1 | 8/2002 | Sarangapani et al. |
| 6,477,660 | B1 | 11/2002 | Sohner |
| 6,513,018 | B1 | 1/2003 | Culhane |
| 6,546,379 | B1 | 4/2003 | Hong et al. |
| 6,584,768 | B1 | 7/2003 | Hecker et al. |
| 6,594,989 | B1 | 7/2003 | Hepburn et al. |
| 6,698,203 | B2 | 3/2004 | Wang |
| 6,711,676 | B1 | 3/2004 | Zomaya et al. |
| 6,721,606 | B1 | 4/2004 | Kaji et al. |
| 6,725,208 | B1 | 4/2004 | Hartman et al. |
| 6,763,708 | B2 | 7/2004 | Ting et al. |
| 6,775,647 | B1 | 8/2004 | Evans et al. |
| 6,785,604 | B2 | 8/2004 | Jacobson |
| 6,810,442 | B1 | 10/2004 | Lin et al. |
| 6,823,675 | B2 | 11/2004 | Brunell et al. |
| 6,859,770 | B2 | 2/2005 | Ramsey |
| 6,859,785 | B2 | 2/2005 | Case |
| 6,865,883 | B2 | 3/2005 | Gomulka |
| 6,882,929 | B2 | 4/2005 | Liang et al. |
| 6,895,286 | B2 | 5/2005 | Kaji et al. |
| 6,935,313 | B2 | 8/2005 | Jacobson |
| 6,941,287 | B1 | 9/2005 | Vaidyanathan et al. |
| 6,952,662 | B2 | 10/2005 | Wegerich et al. |
| 6,976,062 | B1 | 12/2005 | Denby et al. |
| 7,000,229 | B2 | 2/2006 | Gere |
| 7,024,343 | B2 | 4/2006 | El-Ratal |
| 7,027,953 | B2 | 4/2006 | Klein |
| 7,035,834 | B2 | 4/2006 | Jacobson |
| 7,117,079 | B2 | 10/2006 | Streichsbier et al. |
| 7,124,047 | B2 | 10/2006 | Zhang et al. |
| 7,127,892 | B2 | 10/2006 | Akins et al. |
| 7,174,284 | B2 | 2/2007 | Dolansky et al. |
| 7,178,328 | B2 | 2/2007 | Solbrig |
| 7,191,161 | B1 | 3/2007 | Rai et al. |
| 7,194,392 | B2 | 3/2007 | Tuken et al. |
| 7,213,007 | B2 | 5/2007 | Grichnik |
| 7,356,393 | B1 | 4/2008 | Schlatre et al. |
| 7,369,925 | B2 | 5/2008 | Morioka et al. |
| 2002/0014294 | A1 | 2/2002 | Okano et al. |
| 2002/0016701 | A1 | 2/2002 | Duret et al. |
| 2002/0042784 | A1 | 4/2002 | Kerven et al. |
| 2002/0049704 | A1 | 4/2002 | Vanderveldt et al. |
| 2002/0103996 | A1 | 8/2002 | LeVasseur et al. |
| 2002/0198821 | A1 | 12/2002 | Munoz |
| 2003/0018503 | A1 | 1/2003 | Shulman |
| 2003/0055607 | A1 | 3/2003 | Wegerich et al. |
| 2003/0093250 | A1 | 5/2003 | Goebel |
| 2003/0126053 | A1 | 7/2003 | Boswell et al. |
| 2003/0126103 | A1 | 7/2003 | Chen et al. |
| 2003/0130855 | A1 | 7/2003 | Babu et al. |
| 2003/0167354 | A1 | 9/2003 | Peppers et al. |
| 2003/0187567 | A1 | 10/2003 | Sulatisky et al. |
| 2003/0187584 | A1 | 10/2003 | Harris |
| 2003/0200296 | A1 | 10/2003 | Lindsey |
| 2004/0030420 | A1 | 2/2004 | Ulyanov et al. |
| 2004/0034857 | A1 | 2/2004 | Mangino et al. |
| 2004/0059518 | A1 | 3/2004 | Rothschild |
| 2004/0077966 | A1 | 4/2004 | Yamaguchi et al. |
| 2004/0122702 | A1 | 6/2004 | Sabol et al. |
| 2004/0122703 | A1 | 6/2004 | Walker et al. |
| 2004/0128058 | A1 | 7/2004 | Andres et al. |
| 2004/0135677 | A1 | 7/2004 | Asam |
| 2004/0138995 | A1 | 7/2004 | Hershkowitz et al. |
| 2004/0153227 | A1 | 8/2004 | Hagiwara et al. |
| 2004/0230404 | A1 | 11/2004 | Messmer et al. |
| 2004/0267818 | A1 | 12/2004 | Hartenstine |
| 2005/0047661 | A1 | 3/2005 | Maurer |
| 2005/0055176 | A1 | 3/2005 | Clarke et al. |
| 2005/0091093 | A1 | 4/2005 | Bhaskaran et al. |
| 2005/0209943 | A1 | 9/2005 | Ballow et al. |
| 2005/0210337 | A1 | 9/2005 | Chester et al. |
| 2005/0240539 | A1 | 10/2005 | Olavson |
| 2005/0261791 | A1 | 11/2005 | Chen et al. |
| 2005/0262031 | A1 | 11/2005 | Saidi et al. |
| 2005/0278227 | A1 | 12/2005 | Esary et al. |
| 2005/0278432 | A1 | 12/2005 | Feinleib et al. |
| 2006/0010057 | A1 | 1/2006 | Bradway et al. |
| 2006/0010142 | A1 | 1/2006 | Kim et al. |
| 2006/0010157 | A1 | 1/2006 | Dumitrascu et al. |
| 2006/0025897 | A1 | 2/2006 | Shostak et al. |
| 2006/0026270 | A1 | 2/2006 | Sadovsky et al. |
| 2006/0026587 | A1 | 2/2006 | Lemarroy et al. |
| 2006/0064474 | A1 | 3/2006 | Feinleib et al. |
| 2006/0068973 | A1 | 3/2006 | Kappauf et al. |
| 2006/0129289 | A1 | 6/2006 | Kumar et al. |
| 2006/0130052 | A1 | 6/2006 | Allen et al. |
| 2006/0229753 | A1 | 10/2006 | Seskin et al. |
| 2006/0229769 | A1 | 10/2006 | Grichnik et al. |
| 2006/0229852 | A1 | 10/2006 | Grichnik et al. |
| 2006/0229854 | A1 | 10/2006 | Grichnik et al. |
| 2006/0230018 | A1 | 10/2006 | Grichnik et al. |
| 2006/0230097 | A1 | 10/2006 | Grichnik et al. |
| 2006/0230313 | A1 | 10/2006 | Grichnik et al. |
| 2006/0241923 | A1 | 10/2006 | Xu et al. |
| 2006/0247798 | A1 | 11/2006 | Subbu et al. |
| 2007/0061144 | A1 | 3/2007 | Grichnik et al. |
| 2007/0094048 | A1 | 4/2007 | Grichnik |
| 2007/0094181 | A1 | 4/2007 | Tayebnejad et al. |
| 2007/0118338 | A1 | 5/2007 | Grichnik et al. |
| 2007/0124237 | A1 | 5/2007 | Sundararajan et al. |
| 2007/0150332 | A1 | 6/2007 | Grichnik et al. |
| 2007/0168494 | A1 | 7/2007 | Liu et al. |
| 2007/0179769 | A1 | 8/2007 | Grichnik et al. |
| 2007/0203864 | A1 | 8/2007 | Grichnik |
| 2008/0154811 | A1 | 6/2008 | Grichnik et al. |

FOREIGN PATENT DOCUMENTS

| | | |
|---|---|---|
| EP | 1367248 | 12/2003 |
| EP | 1418481 | 5/2004 |

| | | |
|---|---|---|
| JP | 10-160213 | 6/1998 |
| JP | 10-332621 | 12/1998 |
| JP | 11-351045 | 12/1999 |
| JP | 2001-082192 | 3/2001 |
| JP | 2002-276344 | 9/2002 |
| WO | WO97/42581 | 11/1997 |
| WO | WO02/057856 | 7/2002 |
| WO | WO2006/017453 | 2/2006 |

OTHER PUBLICATIONS

April, Jay et al., "Practical Introduction to Simulation Optimization," Proceedings of the 2003 Winter Simulation Conference, pp. 71-78.

Bandte et al., "Viable Designs Through a Joint Probabilistic Estimation Technique," SAE International, and the American Institute of Aeronautics and Astronautics, Inc., Paper No. 1999-01-5623, 1999, pp. 1-11.

Beisl et al., "Use of Genetic Algorithm to Identify the Source Point of Seepage Slick Clusters Interpreted from Radarsat-1 Images in the Gulf of Mexico," Geoscience and Remote Sensing Symposium, 2004, Proceedings, 2004 IEEE International Anchorage, AK, Sep. 20-24, 2004, vol. 6, Sep. 20, 2004, pp. 4139-4142.

Berke et al., "Optimum Design of Aerospace Structural Components Using Neural Networks," Computers and Structures, vol. 48, No. 6, Sep. 17, 1993, pp. 1001-1010.

Bezdek, "Genetic Algorithm Guided Clustering," IEEE 0-7803-1899-4/94, 1994, pp. 34-39.

Brahma et al., "Optimization of Diesel Engine Operating Parameters Using Neural Networks," SAE Technical Paper Series, 2003-01-3228, Oct. 27-30, 2003 (11 pages).

Chau et al., "Use of runs test to access cardiovascular autonomic function in diabetic subjects," Abstract, Diabetes Care, vol. 17, Issue 2, pp. 146-148, available at http://care.diabetesjournals.org/cgi/content/abstract/17/2/146).

Chung et al., "Process Optimal Design in Forging by Genetic Algorithm," Journal of Manufacturing Science and Engineering, vol. 124, May 2002, pp. 397-408.

Cox et al., "Statistical Modeling for Efficient Parametric Yield Estimation of MOS VLSI Circuits," IEEE, 1983, pp. 242-245.

De Maesschalck et al., "The Mahalanobis Distance," Chemometrics and Intelligent Laboratory Systems, vol. 50, No. 1, Jan. 2000, pp. 1-18.

Dikmen et al., "Estimating Distributions in Genetic Algorithms," ISCIS 2003, LNCS 2869, 2003, pp. 521-528.

Galperin, G., et al., "Parallel Monte-Carlo Simulation of Neural Network Controllers," available at http://www-fp.mcs.anl.gov/ccst/research/reports_pre1998/neural_network/galperin.html, printed Mar. 11, 2005 (6 pages).

Gletsos et al., "A Computer-Aided Diagnostic System to Characterize CT Focal Liver Lesions: Design and Optimization of a Neural Network Classifier," IEEE Transactions on Information Technology in Biomedicine, vol. 7, No. 3, Sep. 2003 pp. 153-162.

Grichnik et al., "An Improved Metric for Robust Engineering," Proceedings of the 2007 International Conference on Scientific Computing, Las Vegas, NV (4 pages).

Grichnik et al., Copending U.S. Appl. No. 11/529,267, filed Sep. 29, 2006, entitled Virtual Sensor Based Engine Control System and Method.

Grichnik et al., Copending U.S. Appl. No. 11/730,363, filed Mar. 30, 2007, entitled Prediction Based Engine Control System and Method.

Grichnik et al., Copending U.S. Appl. No. 11/979,408, filed Nov. 2, 2007, entitled Virtual Sensor Network (VSN) System and Method.

Holland, John H., "Genetic Algorithms," Scientific American, Jul. 1992, pp. 66-72.

Hughes et al., "Linear Statistics for Zeros of Riemann's Zeta Function," C.R. Acad. Sci. Paris, Ser. I335 (2002), pp. 667-670.

Ko et al., "Application of Artificial Neural Network and Taguchi Method to Perform Design in Metal Forming Considering Workability," International Journal of Machine Tools & Manufacture, vol. 39, No. 5, May 1999, pp. 771-785.

Kroha et al., "Object Server on a Parallel Computer," 1997 IEEE 0-8186-8147-0/97, pp. 284-288.

Mavris et al.,"A Probabilistic Approach to Multivariate Constrained Robust Design Simulation," Society of Automotive Engineers, Inc., Paper No. 975508, 1997, pp. 1-11.

National Institute of Health, "10-year CVD Risk Calculator" available at http://hin.nhlbi.nih.gov/atpiii/calculator.asp?usertype=prof, printed Aug. 2, 2005, 2 pages.

Obayashi et al, "Multiobjective Evolutionary Computation for Supersonic Wing-Shape Optimization," IEEE Transactions on Evolutionary Computation, vol. 4, No. 2, Jul. 2000, pp. 182-187.

Simpson et al., "Metamodels for Computer-Based Engineering Design: Survey & Recommendations," Engineering with Computers, 2001, vol. 17, pp. 129-150.

Solar Turbines, "InSight System," Oct. 19, 2006, http://mysolar.cat.com.

Solar Turbines, "InSight Systems, Machinery Management Solutions," Oct. 19, 2006.

Song et al., "The Hyperellipsoidal Clustering Using Genetic Algorithm," 1997 IEEE International Conference on Intelligent Processing Systems, Oct. 28-31, 1997, Beijing, China, pp. 592-596.

Sytsma, Sid, "Quality and Statistical Process Control," available at http://www.sytsma.com/tqmtools/ctlchtprinciples.html, printed Apr. 7, 2005, 6 pages.

Taguchi et al., "The Mahalanobis-Taguchi Strategy," A Pattern Technology System, John Wiley & Sons, Inc., 2002, 234 pages.

Taylor et al., "Guidelines for Evaluating and Expressing the Uncertainty of NIST Measurement Results," NIST Technical Note 1297, 1994 Edition, United States Dept. of Commerce, National Institute of Standards and Technology (25 pages).

Woodall, Tsui et al., "A Review and Analysis of the Mahalanobis-Taguchi System," Technometrics, Feb. 2003, vol. 45, No. 1 (15 pages).

Wu et al., "Cam-phasing Optimization Using Artificial Neural Networks as Surrogate Models—Fuel Consumption and Nox Emissions," SAE Technical Paper Series, 2006-01-1512, Apr. 3-6, 2006 (19 pages).

Yang et al., "Similar Cases Retrieval from the Database of Laboratory Test Results," Journal of Medical Systems, vol. 27, No. 3, Jun. 2003, pp. 271-282.

Yuan et al., "Evolutionary Fuzzy C-Means Clustering Algorithm," 1995 IEEE 0-7803-2461-7/95, pp. 2221-2226.

Thompson et al., "Neural Network Modelling of the Emissions and Performance of a Heavy-Duty Diesel Engine," Proc. Inst. Mech. Engrs., vol. 214, Part D (2000), pp. 111-126.

Traver et al., "A Neural Network-Based Virtual NOx Sensor for Diesel Engines", West Virginia University, Mechanical and Aerospace Engineering Dept., Morgantown, WV 26506-6106.

Traver et al., Neural Network-Based Diesel Engine Emissions Prediction Using In-Cylinder Combustion Pressure, SAE Technical Paper Series, 1999-01-1532, May 3-6, 1999 (17 pages.

Grichnik et al., U.S. Appl. No. 11/812,164, filed Jun. 15, 2007.

Jayachandran et al., U.S. Appl. No. 11/529,267, filed Sep. 29, 2006.

* cited by examiner

FIXED-POINT VIRTUAL SENSOR CONTROL SYSTEM AND METHOD

TECHNICAL FIELD

This disclosure relates generally to virtual sensor techniques and, more particularly, to virtual sensor control systems using fixed-point representation.

BACKGROUND

Physical sensors, such as nitrogen oxides ($NO_x$) sensors, are widely used in many products, such as modern vehicles, to measure and monitor various parameters associated with motor vehicles. Physical sensors often take direct measurement of the physical phenomena and convert these measurements into measurement data to be further processed by control systems. Although physical sensors take direct measurements of the physical phenomena, physical sensors and associated hardware are often costly and, sometimes, unreliable. Further, when control systems rely on physical sensors to operate properly, a failure of a physical sensor may render such control systems inoperable.

Instead of direct measurements, virtual sensors are developed to process various physically measured values and to produce values that are previously measured directly by physical sensors. For example, U.S. Pat. No. 5,386,373 (the '373 patent) issued to Keeler et al. on Jan. 31, 1995, discloses a virtual continuous emission monitoring system with sensor validation. The '373 patent uses a back propagation-to-activation model and a monte-carlo search technique to establish and optimize a computational model used for the virtual sensing system to derive sensing parameters from other measured parameters.

Other techniques try to establish complex mathematical models to be used as virtual sensors. For example, Michael L. Traver et al., "*A Neural Network-Based Virtual NOx Sensor for Diesel Engines*," discloses an in-cylinder combustion model using in-cylinder combustion-pressure-based variables to predict values of $NO_x$ emissions.

However, these conventional techniques involve a large amount of run-time computation, often in floating-point representation, and may be computationally impractical for real-time applications. In particular, when virtual sensor models are implemented on an embedded computer platform without floating-point arithmetic hardware, the large amount of streaming floating-point math conversion may significantly decrease performance of the embedded computer platform.

Methods and systems consistent with certain features of the disclosed systems are directed to solving one or more of the problems set forth above.

SUMMARY

One aspect of the present disclosure includes a method for a control system of a machine. The method may include establishing a virtual sensor model indicative of interrelationships between at least one sensing parameter and a plurality of measured parameters related to the machine. The method may also include obtaining data and function information representing the virtual sensor model and converting the data information into fixed-point representation. Further, the method may include converting the function information into fixed-point representation and loading the converted fixed-point representation of data information and function information in the control system such that the control system uses the virtual sensor model in fixed-point arithmetic operation.

Another aspect of the present disclosure includes a computer system for converting a virtual sensor model to fixed-point representation used by a control system of a machine. The computer system may include a database and a processor. The database may be configured to store information relevant to the virtual sensor model. The processor may be configured to establish the virtual sensor model indicative of interrelationships between at least one sensing parameter and a plurality of measured parameters related to the machine. Further, the processor may be configured to obtain data and function information representing the virtual sensor model and to convert the data information into fixed-point representation. The processor may also be configured to convert the function information into fixed-point representation and to load the converted fixed-point representation of data information and function information in the control system such that the control system uses the virtual sensor model in fixed-point arithmetic operation.

DETAILED DESCRIPTION

Reference will now be made in detail to exemplary embodiments, which are illustrated in the accompanying drawings. Wherever possible, the same reference numbers will be used throughout the drawings to refer to the same or like parts.

Figure 1:
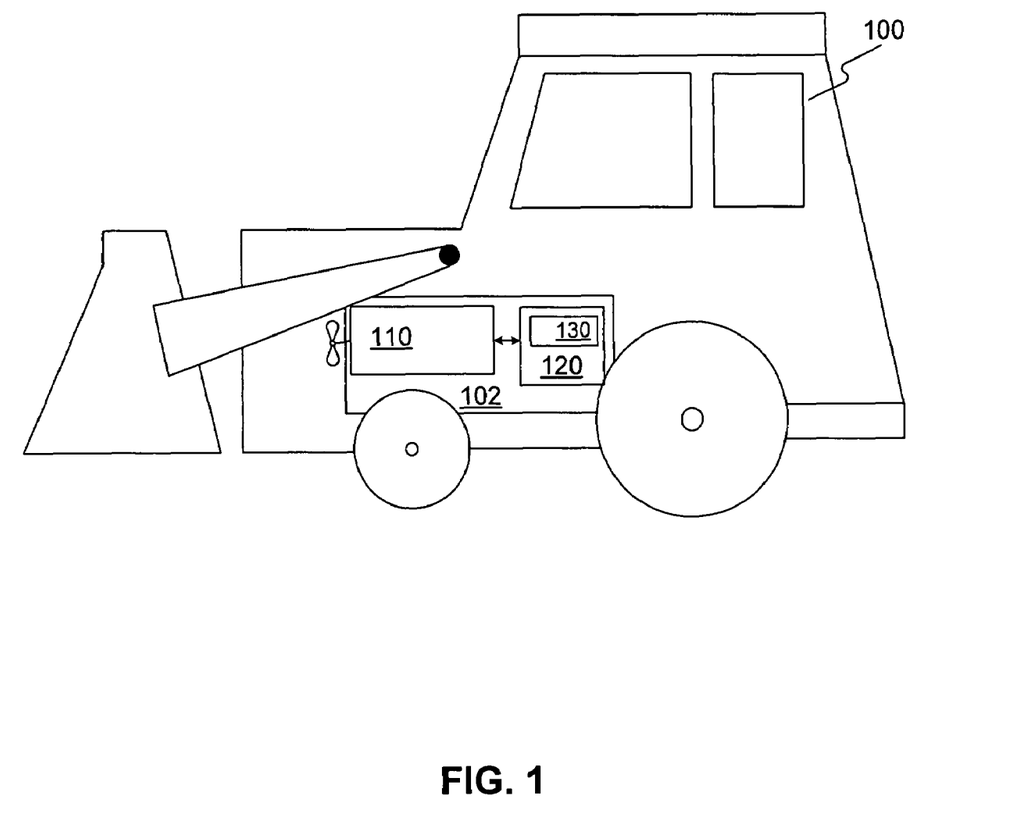
FIG. 1 illustrates an exemplary machine in which features and principles consistent with certain disclosed embodiments may be incorporated.

FIG. 1 illustrates an exemplary machine 100 in which features and principles consistent with certain disclosed embodiments may be incorporated. Machine 100 may include any type of fixed or mobile machine that performs some type of operation associated with a particular industry. Machine 100 may also include any type of commercial vehicles such as cars, vans, and other vehicles.

As shown in FIG. 1, machine 100 may include an engine system 102. Engine system 102 may include an engine 110 and an engine control module (ECM) 120. Further, ECM 120 may include a fixed-point virtual sensor system 130. It is understood that the devices are listed for illustrative purposes, and other devices or components may also be included. For example, engine system 102 may also include various physical sensors (not shown) provided for measuring certain parameters of vehicle operating environment or engine parameters, such as emission sensors for measuring emissions of machine 100, such as nitrogen oxides ($NO_x$), sulfur dioxide ($SO_2$), carbon monoxide (CO), total reduced sulfur (TRS), etc.

Figure 2:
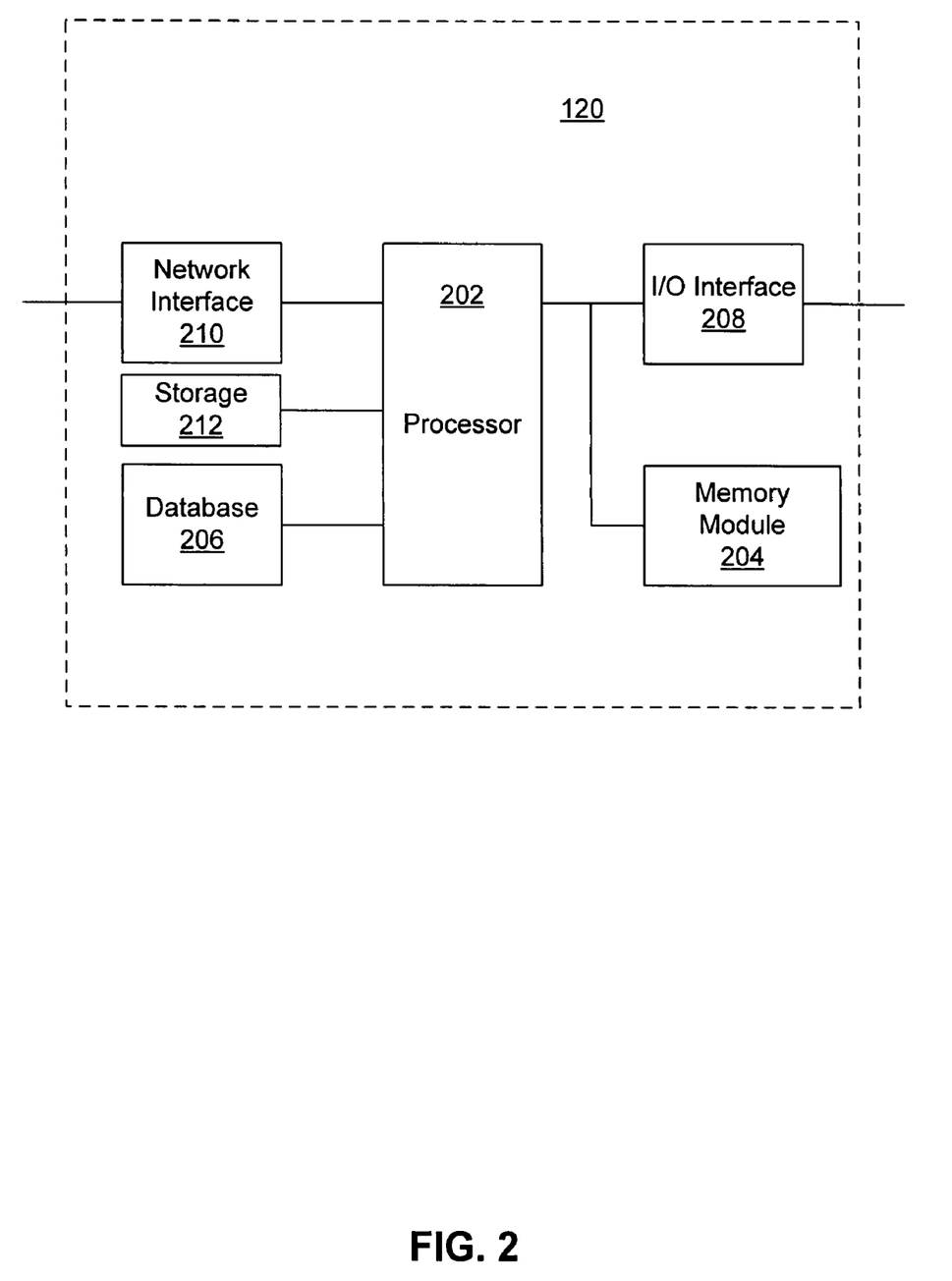
FIG. 2 illustrates a block diagram of an exemplary control system consistent with certain disclosed embodiments.

Engine 110 may include any appropriate type of engine or power source that generates power for machine 100, such as an internal combustion engine or an electric-gas hybrid engine, etc. ECM 120 may include any appropriate type of engine control system configured to perform engine control functions such that engine 110 may operate properly. Further, ECM 120 may also control other systems of machine 100, such as transmission systems, and/or hydraulics systems, etc. FIG. 2 shows an exemplary functional block diagram of ECM 120.

As shown in FIG. 2, ECM 120 may include a processor 202, a memory module 204, a database 206, an I/O interface 208, a network interface 210, and a storage 212. Other components or devices, however, may also be included in ECM 120. Further, the listed devices and other devices may be implemented in hardware, such as field programmable gate array (FPGA) devices, etc., computer software, or a combination of hardware and software. Certain FPGA devices may be reconfigured to selectively support functions provided by the listed devices.

Processor 202 may include any appropriate type of general purpose microprocessor, digital signal processor, or microcontroller. Memory module 204 may include one or more memory devices including, but not limited to, a ROM, a flash memory, a dynamic RAM, and/or a static RAM. Memory module 204 may be configured to store information used by processor 202. More than one memory module may be included.

Database 206 may include any type of appropriate database containing information on engine parameters, operation conditions, mathematical models, and/or any other control information. Further, I/O interface 208 may include any appropriate type of device or devices provided to couple processor 202 to various physical sensors or other components (not shown) within engine system 102 or within machine 100.

Information may be exchanged between external devices or components, such as engine 110 or the various physical sensors, etc., and processor 202. A user or users of machine 100 may also exchange information with processor 202 through I/O interface 208. The users may input data to processor 202, and processor 202 may output data to the users, such as warning or status messages. Further, I/O interface 208 may also be used to obtain data from other components (e.g., the physical sensors, etc.) and/or to transmit data to these components from ECM 120.

Network interface 210 may include any appropriate type of network device capable of communicating with other computer systems based on one or more communication protocols. Network interface 210 may communicate with other computer systems within machine 100 or outside machine 100 via certain communication media such as control area network (CAN), local area network (LAN), and/or wireless communication networks.

Storage 212 may include any appropriate type of mass storage provided to store any type of information that processor 202 may need to operate. For example, storage 212 may include one or more floppy disk devices, hard disk devices, optical disk devices, or other storage devices to provide storage space.

Returning to FIG. 1, ECM 120 may include fixed-point virtual sensor system 130 for providing various parameters used in engine control functions. Fixed-point virtual sensor system 130 may include any appropriate type of control system that generate values of sensing parameters based on a computational model and a plurality of measured parameters via fixed-point arithmetic operation.

As used herein, the sensing parameters may refer to those measurement parameters that are directly measured by a particular physical sensor. For example, a physical $NO_x$ emission sensor may measure the $NO_x$ emission level of machine 100 and provide values of $NO_x$ emission level, the sensing parameter, to ECM 120.

A virtual sensor, as used herein, may refer to a mathematical algorithm or model that produces output measures comparable to a physical sensor based on inputs from other systems, such as physical sensors (not shown). Fixed-point virtual sensor system 130 may include a virtual sensor to predict or derive a sensing parameter such that a corresponding physical sensor may be omitted. In certain embodiments, fixed-point virtual sensor system 130 may include a plurality of virtual sensor models. For example, fixed-point virtual sensor system 130 may include a virtual $NO_x$ emission sensor to replace or supplement the physical $NO_x$ emission sensor to predict the sensing parameter of $NO_x$ emission level.

Sensing parameters may also include any output parameters that may be measured indirectly by physical sensors and/or calculated based on readings of physical sensors. For example, a virtual sensor may provide an intermediate sensing parameter that may be unavailable from any physical sensor. In general, sensing parameters may be included in outputs of a virtual sensor.

On the other hand, the measured parameters, as used herein, may refer to any parameters relevant to the sensing parameters and indicative of the state of a component or components of machine 100, such as engine 110. For example, for the sensing parameter $NO_x$ emission level, measured parameters may include machine and environmental parameters, such as compression ratios, turbocharger efficiency, after cooler characteristics, temperature values, pressure values, ambient conditions, fuel rates, and engine speeds, etc. Measured parameters may often be included in inputs to be provided to a virtual sensor.

Further, the virtual sensor of fixed-point virtual sensor system 130 may be created or configured with fixed-point representation and may be operated through fixed-point arithmetic operation. As used herein, fixed-point representation of a virtual sensor may include fixed-point representation of both data (e.g., numbers) and functions associated with the virtual sensor.

Fixed-point representation of a number may include a data type for the number that has a fixed number of digits before and after the radix point (e.g. "I.F"), where 'I' represents integer digits, 'F' represents fraction digits, and '.' represents the radix point. In certain embodiments, a scaled integer (SI) data type may be used to represent the number. The SI data type may use a basic unit called "scaling," a power of 2, to calculate what size of integer is needed, i.e., 8, 16, or 32 bits, to represent the number. For example, if the scaling is determined as $2^{-10}$, a real number of 72.1243 may be represented in fix point by counting a total number of scaling units ($2^{-10}$). The total number may then be used to determine the size of the fixed point number. For the number of 72.1243, a total number of 73855 of $2^{-10}$ is determined. Because this integer (73855) can be represented by 16 bits, that is, internal representation as an unsigned 16 bit number with the value of 73855, the number 72.1243 can be represented by the fixed point number 73855 and a scaling of $2^{-10}$.

While binary fixed-point numbers can represent fractional powers of two exactly, binary fixed-point numbers cannot exactly represent fractional powers of ten, and approximation may be needed to use binary fix-point numbers to replace decimal fixed-point or floating-point representations. The degree of approximation may be determined by an allowed error margin or precision. In the above example, the fixed point number has a value of $73855*2^{-10}=72.124023$. This difference is due to the fact that fixed point number with $2^{-10}$ scaling can not exactly represent that number. Further, fixed-point representation of a function may refer to a function configured to produce a fixed-point output through fixed-point arithmetic operation.

ECM 120 may implement fixed-point virtual sensor system 130 using computer software, hardware, or a combination of software and hardware. For example, ECM 120 may execute software programs to generate the values of sensing parameters (e.g., $NO_x$ emission level) based on a computational model and other parameters. By using fixed-point operation, ECM 120 may overcome a lack of floating-point hardware support, or may increase execution speed of the virtual sensor model.

Figure 3:
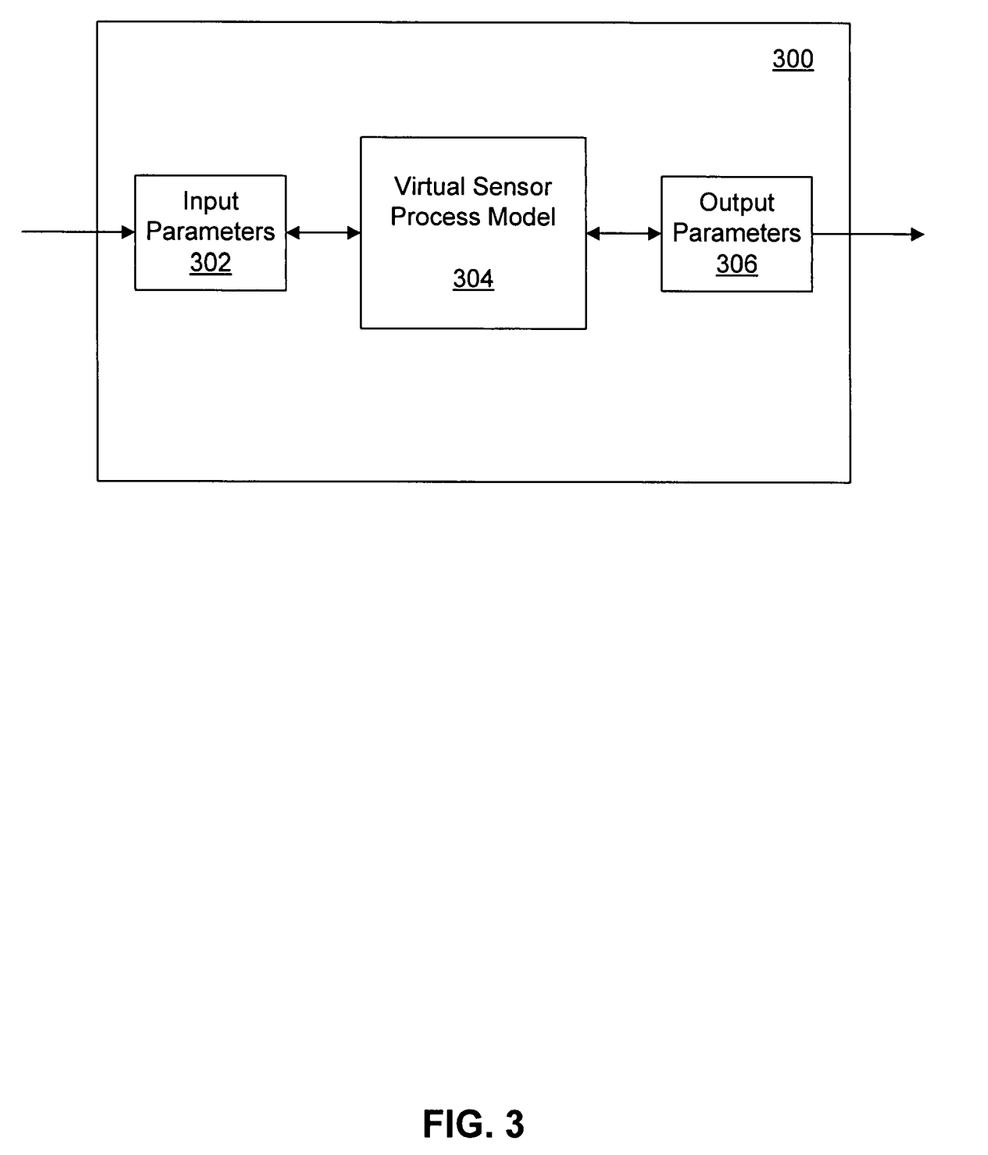
FIG. 3 illustrates a block diagram of an exemplary fixed-point virtual sensor system consistent with certain disclosed embodiments.

In operation, computer software instructions may be stored in or loaded to ECM 120. ECM 120 may execute the computer software instructions to perform various control functions and processes to control engine 110 and to automatically adjust engine operational parameters, such as fuel injection timing and fuel injection pressure, etc. In particular, ECM 120 may execute computer software instructions to generate and/or operate fixed-point virtual sensor system 130 and virtual sensors included in fixed-point virtual sensor system 130 to provide engine emission values and other parameter values used to control engine 110. FIG. 3 shows a logical block diagram of an exemplary virtual sensor 300 included in fixed-point virtual sensor system 130.

As shown in FIG. 3, virtual sensor 300 may include a virtual sensor model 304, input parameters 302, and output parameters 306. Virtual sensor model 304 may be established to build interrelationships between input parameters 302 (e.g., measured parameters) and output parameters 306 (e.g., sensing parameters). After virtual sensor model 304 is established, values of input parameters 302 may be provided to virtual sensor model 304 to generate values of output parameters 306 based on the given values of input parameters 302 and the interrelationships between input parameters 302 and output parameters 306 established by virtual sensor model 304.

In certain embodiments, virtual sensor 300 may be configured to include a virtual emission sensor to provide levels of substance emitted from an exhaust system (not shown) of engine 110, such as levels of nitrogen oxides ($NO_x$), sulfur dioxide ($SO_2$), carbon monoxide (CO), total reduced sulfur (TRS), soot (i.e., a dark powdery deposit of unburned fuel residues in emission), and/or hydrocarbon (HC), etc. In particular, $NO_x$ emission level, soot emission level, and HC emission level may be important to normal operation of engine 110 and/or to meet certain environmental requirements. Other emission levels, however, may also be included.

Input parameters 302 may include any appropriate type of data associated with or related to the regulated emission levels. For example, input parameters 302 may include parameters that control operations of various characteristics of engine 110 and/or parameters that are associated with conditions corresponding to the operations of engine 110. Input parameters 302 may include engine speed, fuel rate, injection timing, intake manifold temperature (IMAT), intake manifold pressure (IMAP), inlet valve actuation (IVA) end of current, IVA timing, injection pressure, etc. Further, input parameters 302 may be measured by certain physical sensors, such as a high precision lab grade physical sensor, or created by other control systems. Other parameters, however, may also be included. For example, input parameters 302 may also include some or all of total fuel injection quantity, oxygen/fuel molar ratio, atmospheric pressure, total induction mass flow, etc.

On the other hand, output parameters 306 may correspond to sensing parameters. For example, output parameters 306 of virtual sensor 300 may include an emission level of $NO_x$, a soot emission level, or an HC emission level, etc. Other types of output parameters, however, may also be used by virtual sensor 300. Output parameters 306 (e.g., $NO_x$ emission level, soot emission level, or HC emission level) may be used by ECM 120 to predict regulated emission levels and to control engine 110.

Virtual sensor model 304 may include any appropriate type of mathematical or physical model indicating interrelationships between input parameters 302 and output parameters 306. For example, virtual sensor model 304 may be a neural network based mathematical model that is trained to capture interrelationships between input parameters 302 and output parameters 306. Other types of mathematic models, such as fuzzy logic models, linear system models, multiple regression models, time-lagged models, and/or non-linear system models, etc., may also be used.

Virtual sensor model 304 may be trained and validated using data records collected from a particular engine application for which virtual sensor model 304 is established. That is, virtual sensor model 304 may be established and/or operated according to particular rules corresponding to a particular type of model using the data records, and the interrelationships of virtual sensor model 304 may be verified by using part of the data records.

After virtual sensor model 304 is trained and validated, virtual sensor model 304 may be used to define an optimized or desired input space of input parameters 302 resulting in a desired distribution of output parameters 306. The validated or optimized control system using virtual sensor model 304 may be used to produce corresponding values of output parameters 306 when provided with a set of values of input parameters 302.

Figure 4:
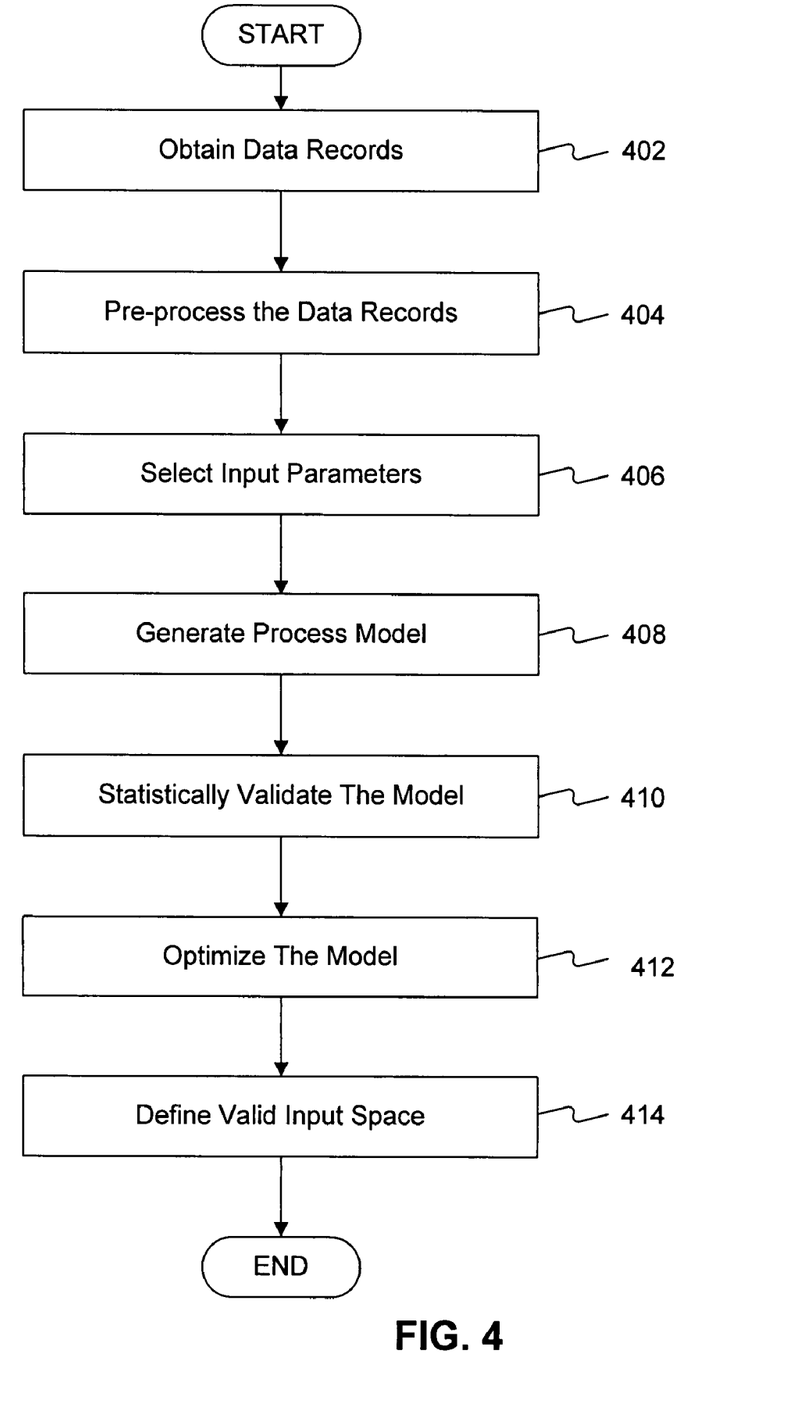
FIG. 4 a flowchart diagram of an exemplary virtual sensor model generation and optimization process consistent with certain disclosed embodiments.

The establishment and operations of virtual sensor model 304 may be carried out by processor 202 based on computer programs stored on or loaded to virtual sensor 300. Alternatively, the establishment of virtual sensor model 304 may be realized by other computer systems, such as a separate computer system (not shown) configured to create models. Virtual sensor 300 may be loaded to ECM 120 for operations. FIG. 4 shows an exemplary model generation and optimization process performed by processor 202.

As shown in FIG. 4, at the beginning of the model generation and optimization process, processor 202 may obtain data records associated with input parameters 302 and output parameters 306.(step 402). The data records may include information characterizing engine operations and emission levels including $NO_x$ emission levels, soot emission levels, and/or HC emission levels. Physical sensors (not shown) may be provided to generate data records on output parameters 306 (e.g., sensing parameters such as $NO_x$ emission levels, soot emission levels, and/or HC emission levels).

ECM 120 or processor 202 may also provide data records on input parameters 302 (e.g., measured parameters, such as fuel rate, injection timing, intake manifold pressure, intake manifold temperature, IVA end of current, injection pressure, engine speed, and certain delayed parameters, etc.). Further, the data records may include both input parameters 302 and output parameters 306 and may be collected based on various engines or based on a single test engine, under various predetermined operational conditions. In certain embodiments, operational conditions such as engine transient operations may also be used to collect data records of input parameters 302 and output parameters 306.

The data records may also be collected from experiments designed for collecting such data. Alternatively, the data records may be generated artificially by other related processes, such as other emission modeling or analysis processes. The data records may also include training data used to build virtual sensor model 304 and testing data used to validate virtual sensor model 304. In addition, the data records may also include simulation data used to observe and optimize virtual sensor model 304.

The data records may reflect characteristics of input parameters 302 and output parameters 306, such as statistic distributions, normal ranges, and/or precision tolerances, etc. After obtaining the data records (step 402), processor 202 may pre-process the data records to clean up the data records for obvious errors and to eliminate redundancies (step 404). Processor 202 may remove approximately identical data records and/or remove data records that are out of a reasonable range in order to be meaningful for model generation and optimization. Common methods for determining similarity may include clustering algorithms, sorting, and state-vector machines. Additionally, some data streams may be offset in time relative to the desired output to be modeled by virtual sensor model 304. In this case, a time-series correlation study may be performed on the candidate inputs to identify optimal time lags in the data records. The data stream can then be adjusted during the preprocessing stage to simplify virtual sensor model 304. After the data records have been pre-processed, processor 202 may select proper input parameters by analyzing the data records (step 406).

The data records may be associated with many input variables, such as variables corresponding to fuel rate, injection timing, intake manifold pressure, intake manifold temperature, IVA end of current, injection pressure, and engine speed, etc. and other variables that are not corresponding to above listed parameters, such as torque, acceleration, etc. The number of input variables may be greater than the number of a particular set of input parameters 102 used for virtual sensor model 304. That is, input parameters 102 may be a subset of the input variables, and only selected input variables may be included in input parameters 302. For example, input parameter 302 may include fuel rate, injection timing, intake manifold pressure, intake manifold temperature, IVA end of current, injection pressure, and engine speed, etc., of the input variables.

A large number of input variables may significantly increase computational time during generation and operations of the mathematical models. The number of the input variables may need to be reduced to create mathematical models within practical computational time limits. That is, input parameters 302 may be selected from the input variables such that virtual sensor model 304 may be operated with a desired speed or efficiency. Additionally, in certain situations, the number of input variables in the data records may exceed the number of the data records and lead to sparse data scenarios. Some of the extra input variables may have to be omitted in certain mathematical models such that practical mathematical models may be created based on reduced variable number.

Processor 202 may select input parameters 302 from the input variables according to predetermined criteria. For example, processor 202 may choose input parameters 302 by experimentation and/or expert opinions. Alternatively, in certain embodiments, processor 202 may select input parameters based on a mahalanobis distance between a normal or reference data set and an abnormal or variant data set of the data records. The normal data set and abnormal data set may be defined by processor 202 using any appropriate method. For example, the normal data set may include characteristic data associated with input parameters 302 that produce desired values of output parameters 306. On the other hand, the abnormal data set may include any characteristic data that may be out of tolerance or may need to be avoided. The normal data set and abnormal data set may be predefined by processor 202.

Mahalanobis distance may refer to a mathematical representation that may be used to measure data profiles based on correlations between parameters in a data set. Mahalanobis distance differs from Euclidean distance in that mahalanobis distance takes into account the correlations of the data set. Mahalanobis distance of a data set X (e.g., a multivariate vector) may be represented as $$MD_i = (X_i - \mu_x)\Sigma^{-1}(X_i - \mu_x)' \qquad (1)$$

where $\mu x$ is the mean of X and $\Sigma^{-1}$ is an inverse variance-covariance matrix of X. $MD_i$ weights the distance of a data point $X_i$ from its mean $\mu_x$ such that observations that are on the same multivariate normal density contour will have the same distance. Such observations may be used to identify and select correlated parameters from separate data groups having different variances.

Processor 202 may select input parameter 302 as a desired subset of input variables such that the mahalanobis distance between the normal data set and the abnormal data set is maximized or optimized. A genetic algorithm may be used by processor 202 to search input variables for the desired subset with the purpose of maximizing the Mahalanobis distance between the normal and abnormal data sets. Processor 202 may select a candidate subset of the input variables based on a predetermined criteria and calculate a Mahalanobis distance $MD_{normal}$ of the normal data set and a Mahalanobis distance $MD_{abnormal}$ of the abnormal data set. Processor 202 may also calculate the Mahalanobis distance between the normal data set and the abnormal data (i.e., the deviation of the Mahalanobis distance $MD_x = MD_{normal} - MD_{abnormal}$). Other types of deviations, however, may also be used.

Processor 202 may select the candidate subset of input variables if the genetic algorithm converges (i.e., the genetic algorithm finds the maximized or optimized Mahalanobis distance between the normal data set and the abnormal data set corresponding to the candidate subset). If the genetic algorithm does not converge, a different candidate subset of input variables may be created for further searching. This searching process may continue until the genetic algorithm converges and a desired subset of input variables (e.g., input parameters 302) is selected.

Optionally, Mahalanobis distance may also be used to reduce the number of data records by choosing a subset of data records that achieve a desired difference in Mahalanobis distance, as explained above.

After selecting input parameters 302 (e.g., fuel rate, injection timing, intake manifold pressure, intake manifold temperature, IVA end of current, injection pressure, and engine speed, etc.), processor 202 may generate virtual sensor model 304 to build interrelationships between input parameters 302 and output parameters 306 (step 408). In certain embodiments, virtual sensor model 304 may correspond to a computational model, such as, for example, a computational model built on any appropriate type of neural network.

The type of neural network computational model that may be used may include any appropriate type of neural network model. For example, a feed forward neural network model may be included to establish virtual sensor model 304. Other types of neural network models, such as back propagation, cascaded neural networks, and/or hybrid neural networks, etc., may also be used. Categorical neural networks, such as the ARTMAP or SOMNET, may also be used. Particular types or structures of the neural network used may depend on particular applications. Although neural network models are illustrated, other types of computational models, such as linear system or non-linear system models, decision trees, etc., may also be used.

The neural network computational model (i.e., virtual sensor model 304) may be trained by using selected data records. For example, the neural network computational model may include a relationship between output parameters 306 (e.g., $NO_x$ emission level, soot emission level, and/or HC emission level, etc.) and input parameters 302 (e.g., fuel rate, injection timing, intake manifold pressure, intake manifold temperature, IVA end of current, injection pressure, and engine speed, etc.). The neural network computational model may be evaluated by predetermined criteria to determine whether the training is completed. The criteria may include desired ranges of accuracy, time, and/or number of training iterations, etc.

After the neural network has been trained (i.e., the computational model has initially been established based on the predetermined criteria), processor 202 may statistically validate the computational model (step 410). Statistical validation may refer to an analyzing process to compare outputs of the neural network computational model with actual or expected outputs to determine the accuracy of the computational model. Part of the data records may be reserved for use in the validation process.

Alternatively, processor 202 may also generate simulation or validation data for use in the validation process. This may be performed either independently of a validation sample or in conjunction with the sample. Statistical distributions of inputs may be determined from the data records used for modeling. A statistical simulation, such as Latin Hypercube simulation, may be used to generate hypothetical input data records. These input data records are processed by the computational model, resulting in one or more distributions of output characteristics. The distributions of the output characteristics from the computational model may be compared to distributions of output characteristics observed in a population. Statistical quality tests may be performed on the output distributions of the computational model and the observed output distributions to ensure model integrity.

Once trained and validated, virtual sensor model 304 may be used to predict values of output parameters 306 when provided with values of input parameters 302. Further, processor 202 may optimize virtual sensor model 304 by determining desired distributions of input parameters 302 based on relationships between input parameters 302 and desired distributions of output parameters 306 (step 412).

Processor 202 may analyze the relationships between desired distributions of input parameters 302 and desired distributions of output parameters 306 based on particular applications. For example, processor 202 may select desired ranges for output parameters 306 (e.g., $NO_x$ emission level, soot emission level, or HC emission level that is desired or within certain predetermined range). Processor 202 may then run a simulation of the computational model to find a desired statistic distribution for an individual input parameter (e.g., one of fuel rate, injection timing, intake manifold pressure, intake manifold temperature, IVA end of current, injection pressure, engine speed, and certain delayed parameters, etc.). That is, processor 202 may separately determine a distribution (e.g., mean, standard variation, etc.) of the individual input parameter corresponding to the normal ranges of output parameters 306. After determining respective distributions for all individual input parameters, processor 202 may combine the desired distributions for all the individual input parameters to determine desired distributions and characteristics for overall input parameters 302.

Alternatively, processor 202 may identify desired distributions of input parameters 302 simultaneously to maximize the possibility of obtaining desired outcomes. In certain embodiments, processor 202 may simultaneously determine desired distributions of input parameters 302 based on zeta statistic. Zeta statistic may indicate a relationship between input parameters, their value ranges, and desired outcomes. Zeta statistic may be represented as $$\zeta = \sum_{1}^{j} \sum_{1}^{i} |S_{ij}| \left(\frac{\sigma_i}{\bar{x}_i}\right)\left(\frac{\bar{x}_j}{\sigma_j}\right),$$

where $\bar{x}_i$ represents the mean or expected value of an ith input; $\bar{x}_j$ represents the mean or expected value of a jth outcome; $\sigma_i$ represents the standard deviation of the ith input; $\sigma_j$ represents the standard deviation of the jth outcome; and $|S_{ij}|$ represents the partial derivative or sensitivity of the jth outcome to the ith input.

Under certain circumstances, $\bar{x}_i$ may be less than or equal to zero. A value of $3\sigma_i$ may be added to $\bar{x}_i$ to correct such problematic condition. If, however, $\bar{x}_i$ is still equal zero even after adding the value of $3\sigma_i$, processor 202 may determine that $\sigma_i$ may be also zero and that the model under optimization may be undesired. In certain embodiments, processor 202 may set a minimum threshold for $\sigma_i$ to ensure reliability of models. Under certain other circumstances, $\sigma_j$ may be equal to zero. Processor 202 may then determine that the model under optimization may be insufficient to reflect output parameters within a certain range of uncertainty. Processor 202 may assign an indefinite large number to $\zeta$.

Processor 202 may identify a desired distribution of input parameters 302 such that the zeta statistic of the neural network computational model (i.e., virtual sensor model 304) is maximized or optimized. An appropriate type of genetic algorithm may be used by processor 202 to search the desired distribution of input parameters 302 with the purpose of maximizing the zeta statistic. Processor 202 may select a candidate set of values of input parameters 302 with predetermined search ranges and run a simulation of virtual sensor model 304 to calculate the zeta statistic parameters based on input parameters 302, output parameters 306, and the neural network computational model (e.g., virtual sensor model 304). Processor 202 may obtain $\bar{x}_i$ and $\sigma_i$ by analyzing the candidate set of values of input parameters 302, and obtain $\bar{x}_j$ and $\sigma_j$ by analyzing the outcomes of the simulation. Further, processor 202 may obtain $|S_{ij}|$ from the trained neural network as an indication of the impact of the ith input on the jth outcome.

Processor 202 may select the candidate set of values of input parameters 302 if the genetic algorithm converges (i.e., the genetic algorithm finds the maximized or optimized zeta statistic of virtual sensor model 304 corresponding to the candidate set values of input parameters 302). If the genetic algorithm does not converge, a different candidate set of values of input parameters 302 may be created by the genetic algorithm for further searching. This searching process may continue until the genetic algorithm converges and a desired set of values of input parameters 302 is identified. Processor 202 may further determine desired distributions (e.g., mean and standard deviations) of input parameters 302 based on the desired set of values of input parameters 302. Once the desired distributions are determined, processor 202 may define a valid input space that may include any input parameter within the desired distributions (step 714).

In one embodiment, statistical distributions of certain input parameters may be impossible or impractical to control. For example, an input parameter may be associated with a physical attribute of a device, such as a dimensional attribute of an engine part, or the input parameter may be associated with a constant variable within virtual sensor model 304 itself. These input parameters may be used in the zeta statistic calculations to search or identify desired distributions for other input parameters corresponding to constant values and/or statistical distributions of these input parameters.

Further, optionally, more than one virtual sensor model may be established. Multiple established virtual sensor models may be simulated by using any appropriate type of simulation method, such as statistical simulation. For example, around 150 models may be simulated. Output parameters 306 based on simulation of these multiple virtual sensor models may be compared to select a most-fit virtual sensor model or several most-fit virtual sensor models based on predetermined criteria, such as smallest variance with outputs from corresponding physical sensors, etc. The selected most-fit virtual sensor model 304 may be used in virtual sensor applications and engine control applications embedded in ECM 120.

Figure 5:
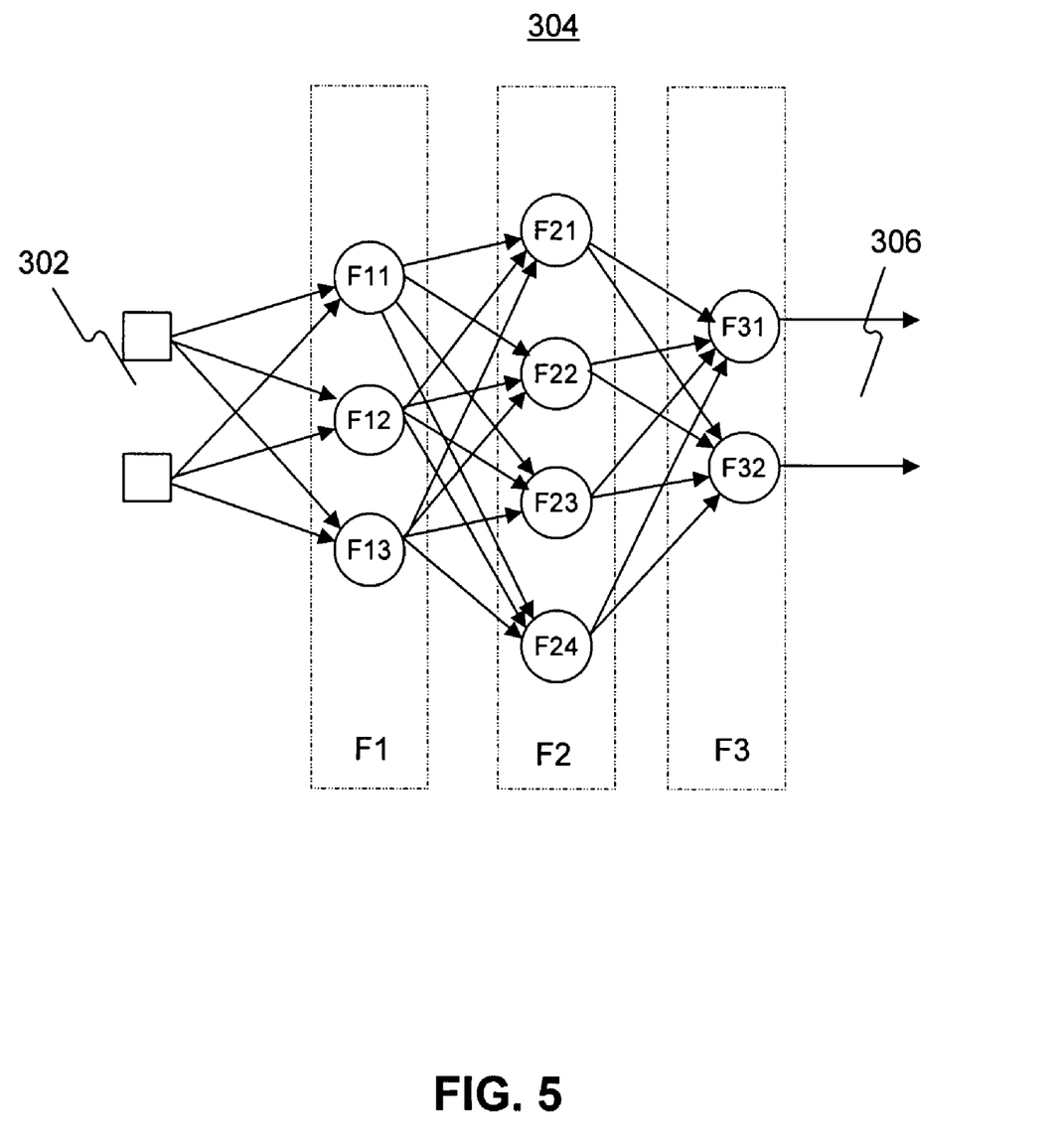
FIG. 5 illustrates a block diagram of an exemplary neural network virtual sensor model consistent with certain disclosed embodiments.

In certain embodiments, virtual sensor model 304 may be a neural network model and may be trained, validated, optimized, and/or selected with floating-point representation or double-precision floating-point representation, virtual sensor model 304 may then be converted into fixed-point representation to be loaded into ECM 120 for fixed-point operation. FIG. 5 shows an exemplary neural network model of virtual sensor 300.

As shown in FIG. 5, virtual sensor model 304 may include a plurality of neural network layers. Each neural network layer may include one or more neural node (i.e., neuron or processing unit). For example, virtual sensor model 304 may include neural network layers F1, F2, and F3. Neural network layer F1 may include neural nodes F11, F12, and F13; neural network layer F2 may include neural nodes F21, F22, F23, and F24; and neural network layer F3 may include neural nodes F31 and F32. The number of layers or neural nodes in FIG. 5 is used for exemplary purpose only, actual number of layers or neural nodes may depend upon particular applications.

The neural nodes from different neural network layers may be coupled between each other over a large number of connections, each may be defined by a weight. Each neural node may also have an activation function, which may produce an output (i.e., a state of the activation) based on an input or a plurality of inputs provided to the neural node. A neural node may also propagate the output to other neural nodes and/or adjust corresponding weights of related connections. Further, a neural network layer may include one or more neural node in a parallel configuration. Although FIG. 5 shows a feed forward neural network, any type of neural network, such as back propagation, or hybrid neural network may also be used.

Figure 6:
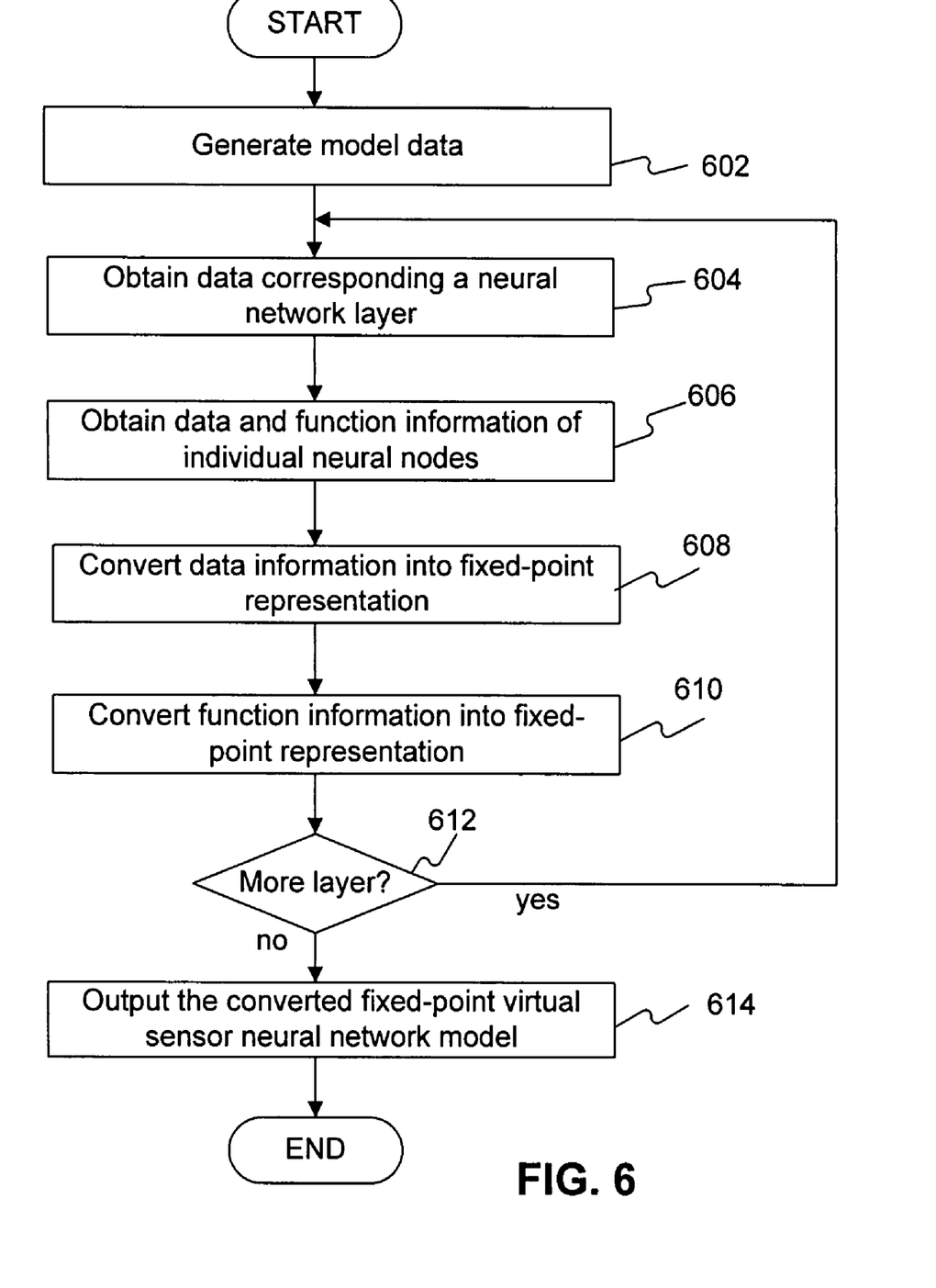
FIG. 6 illustrates a flow chart diagram of an exemplary fixed-point conversion process consistent with certain disclosed embodiments.

Processor 202 may convert virtual sensor model 304 from floating-point representation (e.g., single or double precision floating-point representation) into fixed-point representation. That is, processor 202 may convert data and/or functions associated with virtual sensor model 304 into fixed-point representation such that operation of virtual sensor model 304 may be carried out in fixed-point representation by ECM 120. FIG. 6 shows a flowchart diagram of an exemplary conversion process.

As shown in FIG. 6, processor 202 may generate model data corresponding to virtual sensor model 304 (step 602). The model data may include any appropriate data associated with virtual sensor model 304. For example, the model data may include name, type, storage location, input and output parameters, the number of neural network layers, identifiers of the neural network layers, and information of all neural nodes, such as weights, activation function types, ranges of inputs to the activation functions, and gains and offsets of the activation function, etc. Other model data, however, may also be included.

Processor 202 may generate the model data during the processes of training, validating, and optimizing virtual sensor model 304, as explained above, and may store such model data in certain storage medium, such as database 206. After generating the model data (step 602), processor 202 may obtain data corresponding to a neural network layer for conversion (step 604). That is, processor 202 may convert virtual sensor model 304 layer by layer. Other sequence of conversion, however, may also be used.

For example, processor 202 may read data corresponding to neural network layer F1, such as layer name, type, number of neural nodes, and/or neural node information. From the data corresponding to a neural network layer, processor 202 may obtain data and function information of individual neural nodes included in the neural network layer (step 606). For example, processor 202 may obtain data and function information of F11, F12, and F13 of neural network layer F1.

Further, processor 202 may convert data information of the individual neural nodes into fixed-point representation (step 608). For example, data (e.g., numbers) representing weights of connections between neural nodes, gains and offsets of activation functions of the neural nodes may be converted into fixed-point representation. Processor 202 may determine a fixed-point data type for each number to be converted (e.g., weight, gain, or offset, etc.) of each neural node.

A fixed-point data type of a number, as used herein, may refer to a specific format of binary bits representing the number, such as the number type (e.g., 2's complement signed or unsigned), scaled integer, word length and radix position (e.g., integer word length and fractional word length), truncation mode (e.g., round-off or truncation), and/or overflow mode (e.g., saturation or wrap-around). Processor 202 may determine a desired fixed-point data type for each number to be converted such that a proper fixed-point representation of the number may be created.

For example, a small number may be represented by a fixed-point data type with fewer integer bits but more fraction bits, while a large number may be represented by a fixed-point data type with more integer bits but fewer fraction bits. When the data information includes constant values associated with neural nodes of virtual sensor model 304, processor 202 may determine the fix-point data type based on any appropriate criteria, such as the magnitude and sign of the number to be converted and allowed error margins (i.e., precision), and may convert the data information node by node.

In certain embodiments, as previously explained, processor 202 may determine the fixed-point representation based on the scaled integer (SI) data type. Processor 202 may calculate a total number of scaling unit (e.g., $2^{-10}$) to determine the size of the SI data type. Further, processor 202 may determine the scaling unit based on any appropriate criteria or may obtain the scaling unit information from memory module 204.

Figure 7:
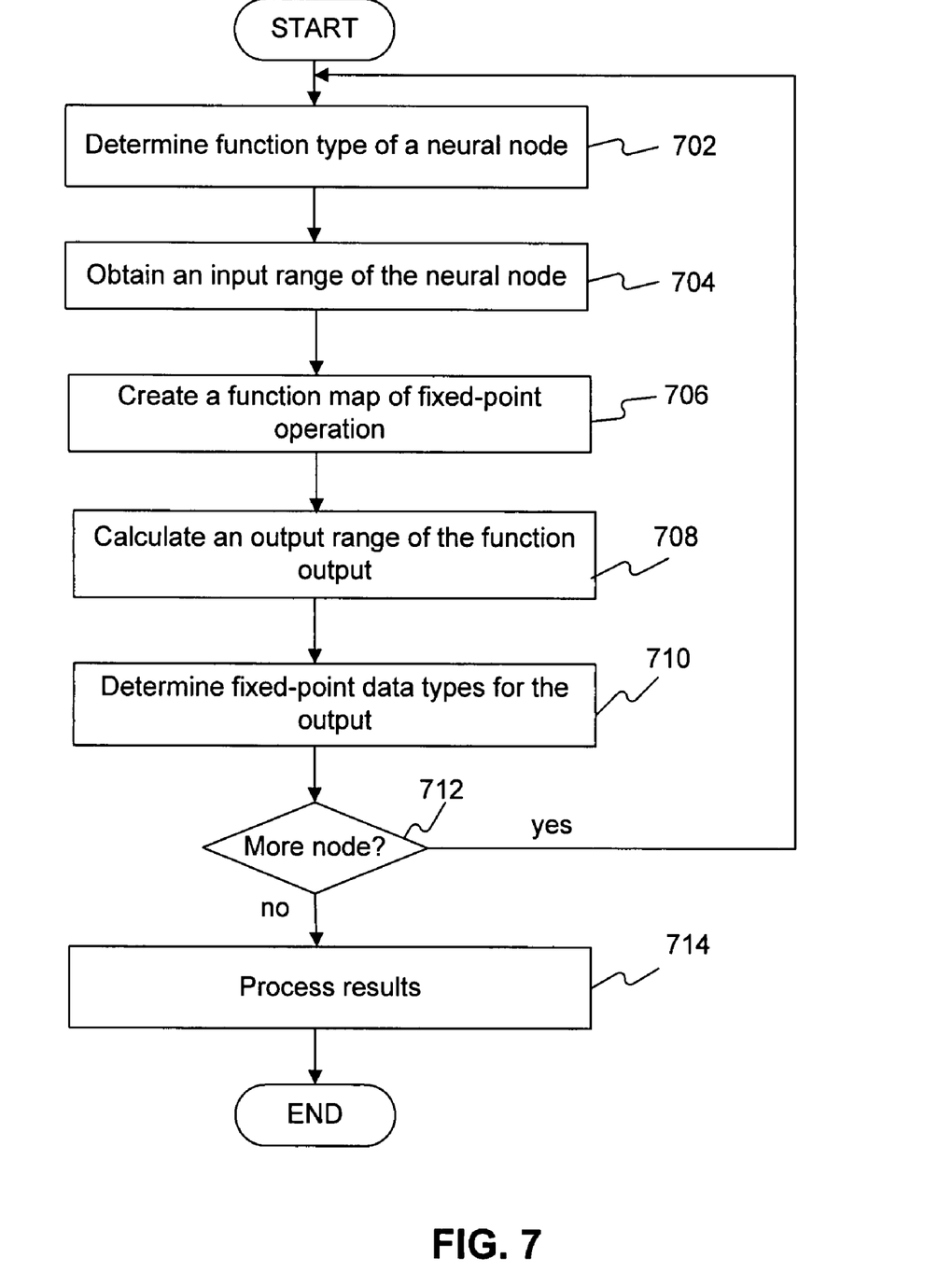
FIG. 7 illustrates a flow chart diagram of an exemplary function conversion process consistent with certain disclosed embodiments.

Processor 202 may also convert function information of the individual neural nodes into fixed-point representation (step 610). The function information may include any appropriate information about activation functions of individual neural nodes, such as types, input and output relationships, and input and output ranges, etc. For example, processor 202 may convert activation functions of the individual neural nodes into fixed-point representation by performing a function conversion process. FIG. 7 shows a flowchart diagram of an exemplary function conversion process.

As shown in FIG. 7, processor 202 may determine a function type of a neural node (step 702). A plurality of activation function types may be used by a particular neural node. For example, the neural node may use an activation function of an identity function, which generates an output as same as an input; an exponential function, a hyperbolic tangent function, or a sigmoidal function, etc. Other function types, however, may also be used. While any neural node may take on any activation function, neural nodes of a particular layer may share a common activation function type.

Processor 202 may obtain input ranges of inputs to the neural node (step 704). Processor 202 may obtain the input ranges from any appropriate source, such as model data. Processor 202 may convert an input range of an input and/or a weighted sum of inputs range of inputs to fixed-point representation, as explained above. Processor 202 may also present the input range and/or the weighted sum of input ranges of inputs to the activation function of the neural node. Further, processor 202 may create a fixed-point function map of the activation function for fixed-point operation (step 706). A function map, as used herein, may refer to any appropriate data structure, such as a table or an array, used to replace a substantial part of run-time computation with certain lookup operation, i.e., link an index input number to an output number. A fixed-point function map may refer to a function map that provides the output in fixed-point representation. In certain embodiments, the function map may also include an interpolation function for providing output values with an input value falling between two index input numbers. Other types of function map may also be included.

Further, processor 202 may calculate an output range of the activation function (step 708). Processor 202 may calculate the output range of the activation function based on the type of the activation function and the input range. For example, for an identity type activation function, processor 202 may calculate the output range of the activation function as the same as the input range. For a hyperbolic type activation function or a sigmoidal type activation function, processor 202 may also calculate the output range of the activation function from the input range as modified by the limited output scope of the hyperbolic function or sigmoidal function. Further, for an exponential type activation function, processor 202 may calculate a maximum output value and a minimum output value based on the input range and the function map of the exponential activation function. Processor 202 may also use interpolation operation to obtain linear approximation output values.

Processor 202 may determine fixed-point data types for outputs of the activation function (step 710). Processor 202 may determine a single fixed-point type for the entire range of the output of the activation function of a neural node, if the entire range can be represented by a fixed-point data type with a desired precision. Processor 202 may also determine a plurality of fixed-point types for different parts of the output range of the activation function of the neural node, if the entire range cannot be represented by a fixed-point data type with the desired precision. Processor 202 may also configure the function map such that a different part of output range may be represented by a different fixed-point data type. Processor 202 may also determine fixed-point data types based on other criteria, such as a user input or data from other control systems (not shown) or computer programs.

Further, processor 202 may determine whether more neural nodes in the neural network layer have an activation function to be converted (step 712). If processor 202 determines that more neural nodes need to be converted (step 712; yes), processor 202 may continue the function conversion process from step 702. On the other hand, if processor 202 determines that no more neural node needs to be converted (step 712; no), processor 202 may process results of the function conversion process (step 714). For example, processor 202 may store the results in a storage medium or a file, or may present the results to other control systems (not shown) or computer programs.

Returning to FIG. 6, after converting function information into fixed-point representation (step 610), processor 202 may determine whether more neural network layers need to be processed (step 612). If processor 202 determines that more neural network layers need to be processed (step 612; yes), processor 202 may continue the process from step 604. On the other hand, if processor 202 determines that no more neural network layer needs to be processed (step 612; no), processor 202 may conclude virtual sensor model 304 is converted into fixed-point representation or a fixed-point virtual sensor neural network model, and may output the converted fixed-point virtual sensor neural network model (step 614).

For example, processor 202 may store the converted fixed-point representation of virtual sensor model 304 in a data file, and may output the data file to a code generator to generate fixed-point binary code to be executed on ECM 120. In certain embodiments, the converted fixed-point representation of virtual sensor model 304 may be directly loaded into ECM 120 to perform fixed-point virtual sensor operations.

ECM 120 may use fixed-point virtual sensor model 304 to perform various sensing functions at a desired computational performance level. For example, virtual sensor model 304 may calculate or predict $NO_x$ emission level, soot emission level, and/or HC emission level and ECM 120 may control engine 110 according to the regulated emission levels provided by virtual sensor 300, and, in particular, by virtual sensor model 304.

In certain embodiments, a separate virtual sensor model 304 may be used to predict a single regulated emission level, such as $NO_x$ emission level, soot emission level, or HC emission level, etc. The separate virtual sensor models may be used concurrently by ECM 120 to provide the control functions. That is, the virtual sensor models may be connected in parallel to provide regulated emission levels. Further, a virtual sensor model 304 may also predict more than one regulated emission level or all regulated emission levels. Further, ECM 120, or processor 202, may also use virtual sensor model 304 to provide other emission control parameters or engine parameters.

INDUSTRIAL APPLICABILITY

The disclosed systems and methods may provide efficient and accurate fixed-point virtual sensor models. Such technology may be used in a wide range of virtual sensors, such as sensors for engines, structures, environments, and materials, etc. In particular, the disclosed systems and methods provide practical solutions when models are difficult to build using other techniques due to computational complexities and limitations. When input parameters are optimized simultaneously to derive output parameters, computation may be minimized. The disclosed systems and methods may be used in combination with other modeling techniques to significantly increase speed, practicality, and/or flexibility.

Further, the disclosed systems and methods may provide fixed-point representation of virtual sensor models that may be implemented in an embedded processor without floating-point hardware support. Computational performance of the embedded processor may be substantially improved by using fixed-point operation for virtual sensors.

The disclosed systems and methods may also provide flexible solutions as well. The disclosed virtual sensor system may be used interchangeably with a corresponding physical sensor and may be used to replace the physical sensor and may operate separately and independently of the physical sensor. The disclosed virtual sensor system may also be used to back up the physical sensor. Moreover, the virtual sensor system may provide parameters that are unavailable from a single physical sensor, such as data from outside the sensing environment. The disclosed systems and methods may also be used by vehicle manufacturers to reduce cost and increase reliability by replacing costly or failure-prone physical sensors. Reliability and flexibility may also be improved by adding backup sensing resources via the disclosed virtual sensor system. The disclosed virtual sensor techniques may be used to provide a wide range of parameters in components such as emission, engine, transmission, navigation, and/or control, etc. Further, parts of the disclosed system or steps of the disclosed method may also be used by computer system providers to facilitate or integrate other models.

Other embodiments, features, aspects, and principles of the disclosed exemplary systems will be apparent to those skilled in the art and may be implemented in various environments and systems.

What is claimed is:

1. A computer system for converting a virtual sensor model to fixed-point representation used by a control system of a machine, comprising:
a database configured to store information relevant to the virtual sensor model; and
a processor configured to:
establish the virtual sensor model indicative of interrelationships between at least one sensing parameter and a plurality of measured parameters related to the machine;
obtain data and function information representing the virtual sensor model;
convert the data information into fixed-point representation;
convert the function information into fixed-point representation; and
load the converted fixed-point representation of data information and function information in the control system such that the control system uses the virtual sensor model in fixed-point arithmetic operation to control the machine.

2. The computer system according to claim 1, wherein:
the virtual sensor model is a neural network virtual sensor model; and
the virtual sensor model includes a plurality of neural network layers, each of which includes one or more neural node.

3. The computer system according to claim 2, wherein:
the neural node includes a weight for a connection between the neural node and a different neural node, and an activation function; and
the data information includes at least the weight and a gain and offset of the activation function.

4. The computer system according to claim 3, wherein, to convert the data information, the processor is configured to:
determine a fixed-point data type for each number included in the data information based on a magnitude and precision of each number; and
convert each number into a fixed-point number according the respective fixed-point data type.

5. The computer system according to claim 2, wherein:
the neural node includes an activation function; and
the function information includes a type, input and output relationship, and input and output ranges of the activation function.

6. The computer system according to claim 5, wherein, to convert the function information, the processor is configured to:
obtain the input range of the activation function;
generate a fixed-point function map representing the input and output relationship of the activation function;
determine the output range of the activation function; and
determine at least one fixed-point data type corresponding to the output range.

7. The computer system according to claim 6, wherein the function type of the activation function is one of an identity function, an exponential function, a hyperbolic tangent function, and a sigmoidal function.

8. The computer system according to claim 6, wherein:
the function type of the activation function is an exponential function; and
the at least one fixed-point data type includes a plurality of fixed-point data types each corresponding to a respective part of the output range determined by the input range and the fixed-point function map.

9. A method for a control system of a machine, comprising:
establishing a virtual sensor model indicative of interrelationships between at least one sensing parameter and a plurality of measured parameters related to the machine;
obtaining data and function information representing the virtual sensor model;
converting the data information into fixed-point representation;
converting the function information into fixed-point representation; and
loading the converted fixed-point representation of data information and function information in the control system such that the control system uses the virtual sensor model in fixed-point arithmetic operation to control the machine.

10. The method according to claim 1, wherein:
the virtual sensor model is a neural network virtual sensor model; and
the virtual sensor model includes a plurality of neural network layers, each of which includes one or more neural node.

11. The method according to claim 10, wherein:
the neural node includes at least one weight for a connection between the neural node and a different neural node, and an activation function; and
the data information includes at least the weight and a gain and offset of the activation function.

12. The method according to claim 11, wherein converting the data information includes:

determining a fixed-point data type for each number included in the data information based on a magnitude and precision of each number; and converting each number into a fixed-point number according the respective fixed-point data type.

13. The method according to claim 10, wherein:

the neural node includes an activation function; and the function information includes a type, input and output relationship, and input and output ranges of the activation function.

14. The method according to claim 13, wherein converting the function information include:

obtaining the input range of the activation function;

generating a fixed-point function map representing the input and output relationship of the activation function;

determining the output range of the activation function; and determining at least one fixed-point data type corresponding to the output range.

15. The method according to claim 14, wherein the function type of the activation function is one of an identity function, an exponential function, a hyperbolic tangent function, and a sigmoidal function.

16. The method according to claim 14, wherein:

the function type of the activation function is an exponential function; and the at least one fixed-point data type includes a plurality of fixed-point data types each corresponding to a respective part of the output range determined by the input range and the fixed-point function map.

17. The method according to claim 10, further including:

obtaining values of the plurality of measured parameters;

providing the obtained values to the virtual sensor model; and obtaining fixed-point value of the at least one measuring parameter from the virtual sensor model through fixed-point arithmetic operation.

18. The method according to claim 17, wherein:

the at least one measuring parameter includes one of a $NO_x$ emission level, a soot emission level, and an HC emission level; and the plurality measured parameters include at least engine speed, fuel rate, injection timing, intake manifold temperature, intake manifold pressure, inlet valve actuation end of current, and injection pressure.

* * * * *

UNITED STATES PATENT AND TRADEMARK OFFICE
CERTIFICATE OF CORRECTION

PATENT NO. : 7,593,804 B2  Page 1 of 1
APPLICATION NO. : 11/980610
DATED : September 22, 2009
INVENTOR(S) : Grichnik et al.

It is certified that error appears in the above-identified patent and that said Letters Patent is hereby corrected as shown below:

Title Page, item (75), under "Inventors", in Column 1, Line 2-3, delete "Tim Felty," and insert -- Timothy T. Felty, --.

Column 6, line 53, delete "306.(step" and insert -- 306 (step --.

Column 8, line 22, delete "µx" and insert -- $\mu_x$ --.

Please correct the Claim as follows:
Column 16, line 54, in Claim 10, delete "claim 1," and insert -- claim 9, --.

Signed and Sealed this

Ninth Day of March, 2010

David J. Kappos
*Director of the United States Patent and Trademark Office*